(12) United States Patent
Snyder

(10) Patent No.: US 12,102,075 B2
(45) Date of Patent: Oct. 1, 2024

(54) FISH DISPATCHING DEVICE

(71) Applicant: Elizabeth Snyder, Apopka, FL (US)

(72) Inventor: Elizabeth Snyder, Apopka, FL (US)

( * ) Notice: Subject to any disclaimer, the term of this patent is extended or adjusted under 35 U.S.C. 154(b) by 64 days.

(21) Appl. No.: 17/983,073

(22) Filed: Nov. 8, 2022

(65) Prior Publication Data

US 2024/0147979 A1   May 9, 2024

(51) Int. Cl.
*A01K 97/00* (2006.01)
(52) U.S. Cl.
CPC .................................. *A01K 97/00* (2013.01)
(58) Field of Classification Search
CPC ................................ A01K 97/00; A01K 99/00
See application file for complete search history.

(56) References Cited

U.S. PATENT DOCUMENTS 5,600,914 A * 2/1997 Tatar ...................... A01K 97/00
                                                        81/439

FOREIGN PATENT DOCUMENTS

DE    202006001850 U1 *  5/2006  ............. A01K 97/00

OTHER PUBLICATIONS https://www.amazon.com/Xtrada-IKEJIME-Authentic-Jime-Tools/dp/B09D749KGR date available: Aug. 20, 2021.*

* cited by examiner

*Primary Examiner* — Richard G Davis
(74) *Attorney, Agent, or Firm* — Jason T. Daniel, Esq.; Daniel Law Offices, P A.

(57) ABSTRACT

A fish dispatching device includes an elongated main body having a first end, a second end, and a hollow interior space. A spike having an opening along a sharpened tip extends outward from the first end of the main body, and an elongated wire is positioned within a continuous interior channel formed by the main body, the spike and the opening. A control knob is connected to the second end of the elongated wire and slides along the length of the main body to extend and retract the second end of the elongated wire through the opening in the spike. The control knob is connected to an elongated slit for cleaning the interior of the main body, and a knife is removably positioned within a sheath located along the second end of the main body.

18 Claims, 5 Drawing Sheets

FISH DISPATCHING DEVICE

TECHNICAL FIELD

The present invention relates generally to fishing and fishing accessories, and more particularly to a fish dispatching device for quickly and humanely killing a fish.

BACKGROUND

The statements in this section merely provide background information related to the present disclosure and may not constitute prior art.

People have been catching and eating fish for millennia. Whether it be commercial fisherman utilizing nets and harvesting equipment, or recreational fisherman using a rod and reel, fish are an important food source for people across the globe.

With particular regard to recreational fisherman, the most common way to dispatch the fish is to either place the fish in a cooler of ice where it asphyxiates, or to use a club to strike the fish in the head until it is dead. Both methods can take a fair amount of time during which the fish suffers and thrashes violently. This violent thrashing causes the adenosine triphosphate (ATP) in the muscle to be consumed, which results in the production of lactic acid and ammonia, which makes the fish sour, soggy and less tasteful.

In recent years, there has been an increased worldwide emphasis on preventing or reducing the suffering encountered by fish during the harvesting process, and a renewed emphasis to reduce the lactic acid and ammonia in the fish meat. To this end, one popular method which originated in Japan called ikejime has become an increasingly popular way to dispatch a fish humanely.

To this end, the ikejime process involves placing a spike into the hindbrain of the fish in order to cause immediate brain death. Once the fish is brain dead and no longer feels any pain, the knife is removed, and a long needle is inserted into the spinal column to eliminate the motor neurons which cause fish to move after death. The needle functions to immediately relax the muscles and stop any further movement.

Although this process is extremely fast and humane, it can be extremely difficult for the novice fisherman to properly align the needle with the spinal cord. In some instances, unexpected movement of the deceased fish has caused the needle to pass through other parts of the fish which can ruin the meat and/or potentially injure the user. This is especially true when large fish such as tuna, halibut, or mahi, are on the boat.

Accordingly, it would be beneficial to provide a fish dispatching device that can quickly and humanely kill and preserve the meat of a fish so as to not suffer from the drawbacks described above.

SUMMARY OF THE INVENTION

The present invention is directed to a fish dispatching device. One embodiment of the present invention can include an elongated main body having a first end, a second end, and a hollow interior space. A spike having a sharpened tip and an opening can extend outward from the first end of the main body, and an elongated wire can be positioned within a continuous interior channel formed by the main body, the spike and the opening.

In one embodiment, a control knob can be connected to the second end of the elongated wire and a slot positioned along the main body. Movements of the control knob can function to extend and retract the second end of the elongated wire through the opening in the spike, and a knife can be removably positioned within a sheath located along the second end of the main body.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
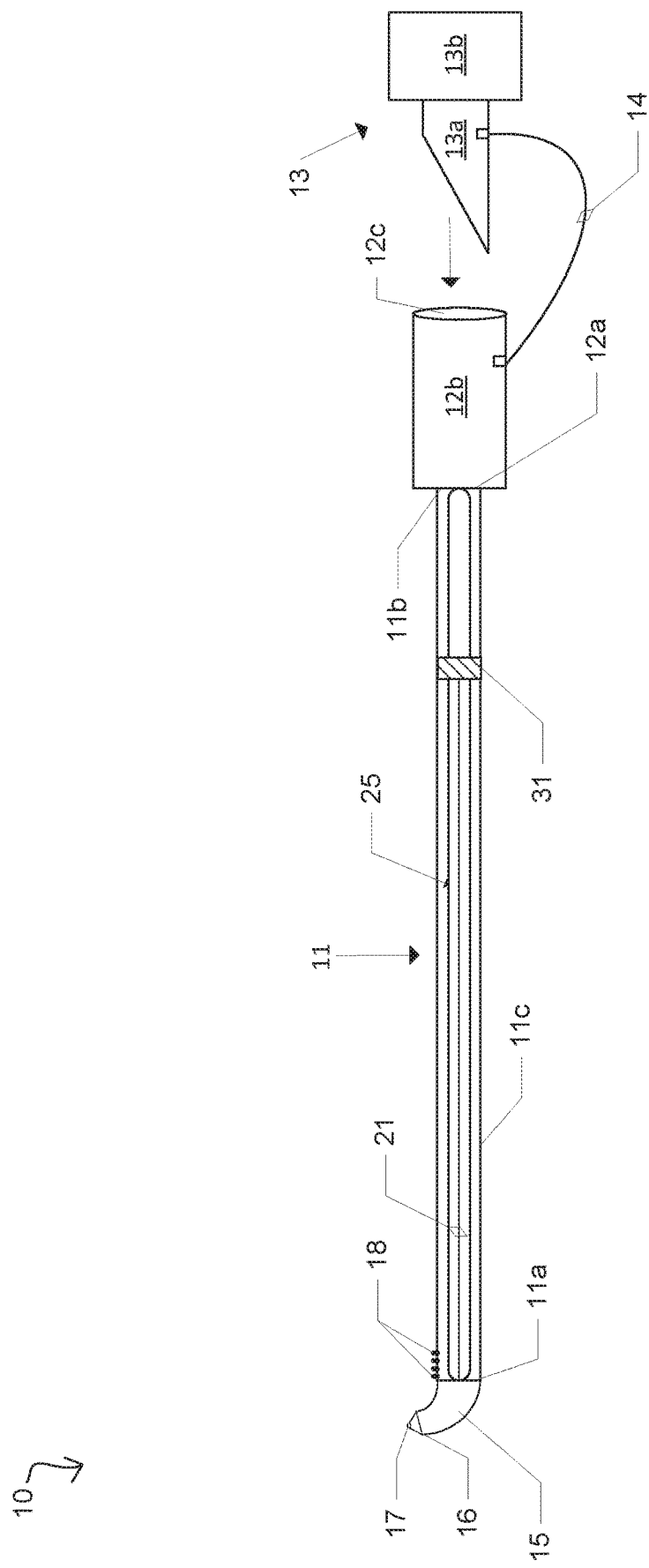
FIG. 1 is a side view of the fish dispatching device that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

FIGS. 1-5 illustrate one embodiment of a fish dispatching device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

Figure 2:
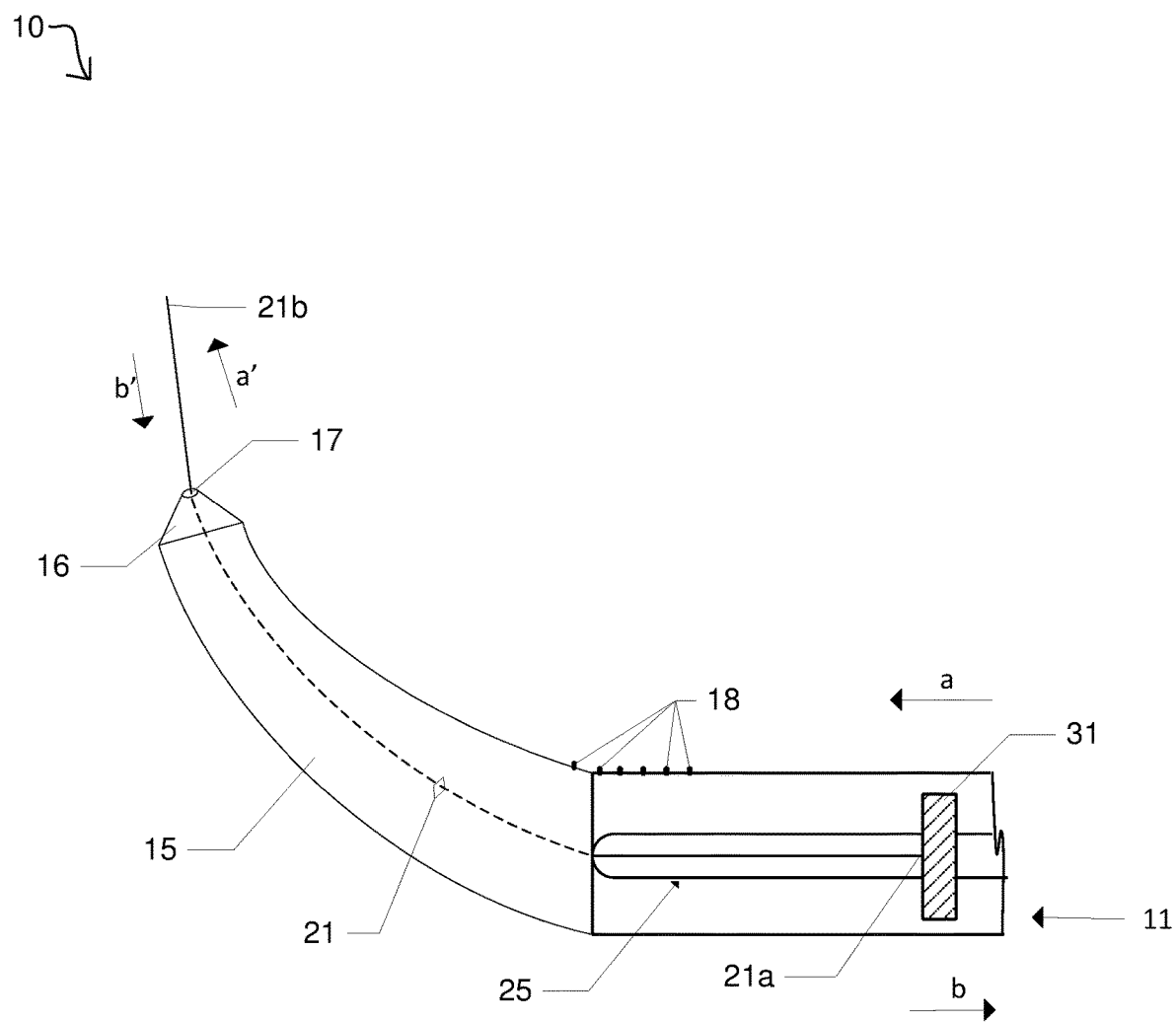
FIG. 2 is a partial cutout view of the spike of the fish dispatching device, in accordance with one embodiment of the invention.
Figure 3:
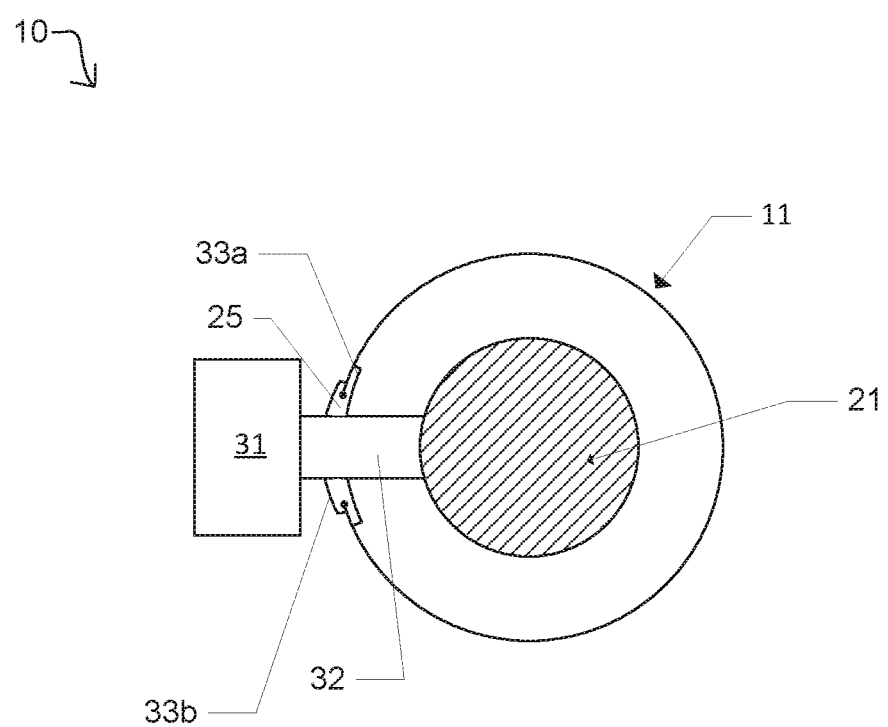
FIG. 3 is a cross sectional view of the main body of the fish dispatching device, in accordance with one embodiment of the invention.

As shown in FIGS. 1-3, one embodiment of the device 10 can include an elongated hollow main body member 11 having a first end 11a, a capped second end 11b and a middle portion 11c. A knife sheath can be positioned along the second end of the main body. The sheath can include a closed first end 12a, a continuous body section 12b and an opening 12c that defines an interior space.

In one embodiment, a short, tipped knife 13 (typically called a "bleeder knife") having a blade 13a and handle 13b can be secured to the main body by a resilient tether 14. The tether functioning to ensure the knife does not become separated from the main body during use, and the sheath providing a storage location for the knife between uses. Of course, any number of other types of knives can be provided.

In one embodiment, a curved hollow spike 15 can extend outward from the first end of the main body, and a plurality of markings 18 can be provided along one or both of the first end of the main body and the spike. As will be described below, the spike can function as the primary instrument for dispatching a fish and can include a sharpened tip 16 having a central opening 17 along the distal end. To this end, each of the markings will preferably include a uniform spacing so as to allow the user to judge the distance at which the spike is inserted into a fish. Moreover, the interior space of the spike, the main body and the tip form a continuous interior channel for the below described wire.

Although illustrated and described as having a curved body section, other embodiments are contemplated wherein the spike does not include a curvilinear body or may include a curvilinear body having a different shape than what is illustrated.

In the preferred embodiment, the main body 11 and the spike will be constructed from a single piece of corrosion resistant metal such as stainless steel or aluminum, for example, so as to withstand years of exposure to fresh water and saltwater, and to allow the components to be thoroughly rinsed and cleaned between uses. Of course, other embodiments are contemplated wherein the main body and spike are constructed as separate components that are joined together in either a removable or permanent manner and/or wherein different construction materials are used. To this end, any number of other strong, lightweight and corrosion resistant materials such as various plastics and other metals are also contemplated.

In either instance, an elongated metallic wire 21 can be positioned within the interior channel of the device. The wire can include a first end 21a that passes through the opening 17 in the spike, and a second end 21b that is connected to a control knob 31 which extends through a slot 25 in the main body. As shown by arrows a and a', a movement of the control knob 31 toward the spike 15 results in the sharpened first end 21a of the wire to pass through the opening 17. Conversely, as shown by arrows b and b', a movement of the control knob 31 away from the spike 15 results in the sharpened first end of the wire 21a to retract within the opening 17.

As shown best in the cross-sectional cutout view of FIG. 3, a shaft 32 can extend from the control knob 31 to the wire 21, and a pair of guides 33a and 33b can engage the inside and outside edges of the main body along the slot 25. Such a feature allows the knob to slide along the length of the slot 25 in order to selectively move the wire (e.g., slidingly engaged).

Moreover, the use of an elongated slot running the length of the main body is utilized to allow the interior of the main body to be thoroughly rinsed and cleaned between uses. Such a feature is important to ensure no harmful bacteria from fish residue can build up along or inside the device components.

Although described as a knob located along the side of the main body-relative to the spike 15, this is for illustrative purposes only. To this end, the control knob 31 can include any number of different shapes and sizes, and both the knob 31 and the slot 25 can be positioned at other locations along the main body. Moreover, any number of other types of devices and control mechanisms can be provided in order to selectively extend and retract the wire from the device.

Although not illustrated, one alternate embodiment is contemplated wherein the wire is connected to an electric linear actuator that is positioned within the main body. The actuator or other such motor can be connected to an onboard battery and control switch located on the main body so as to electrically operate the wire.

Figure 4:
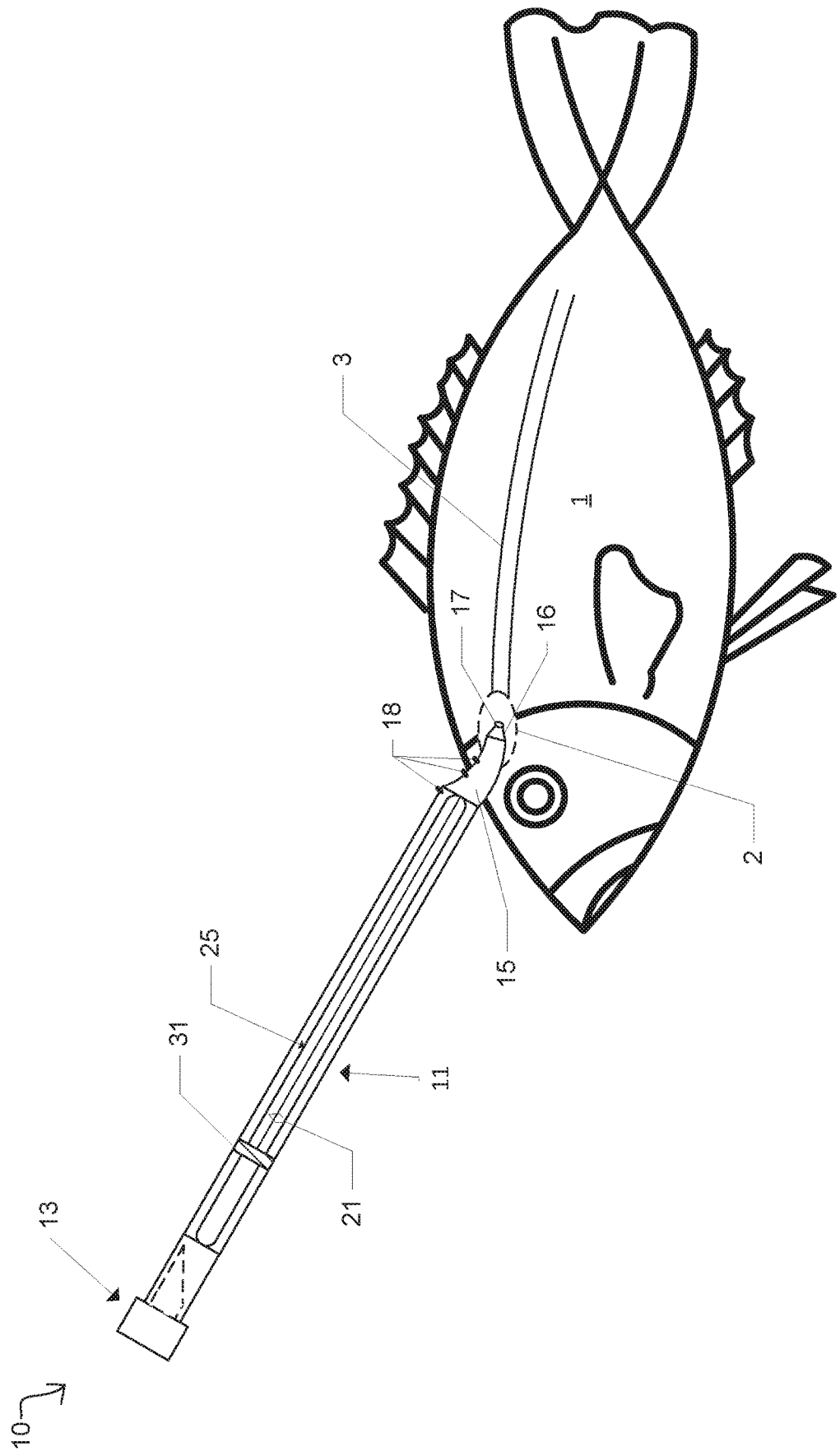
FIG. 4 is a perspective view of the fish dispatching device in operation, in accordance with one embodiment of the invention.
Figure 5:
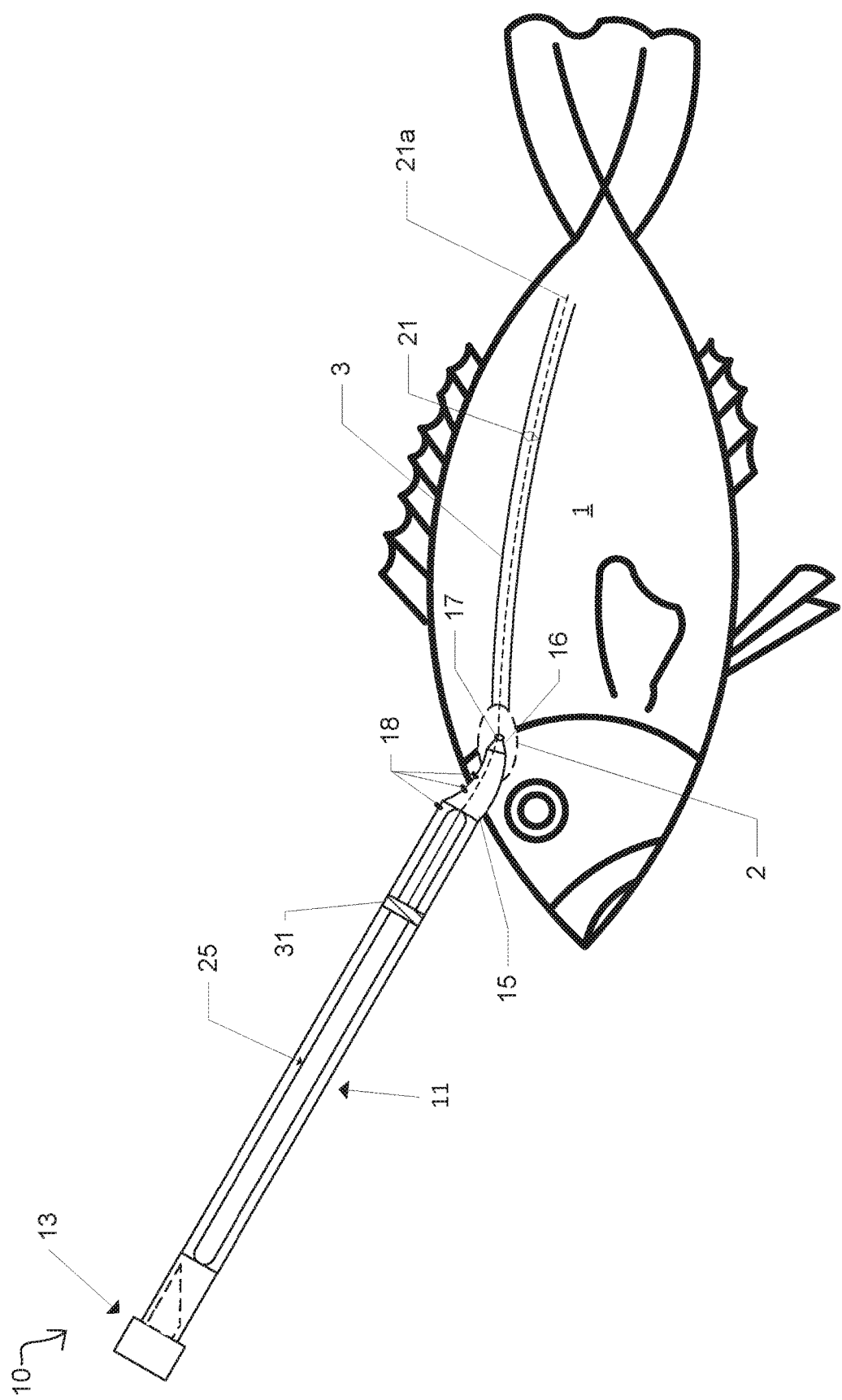
FIG. 5 is another perspective view of the fish dispatching device in operation, in accordance with one embodiment of the invention.

FIGS. 4 and 5 illustrate one embodiment of the device 10 in operation. As shown, the sharpened tip 16 of the spike 15 can penetrate the head of a fish 1 until the tip is in the hindbrain 2 so as to quickly and humanely dispatch the fish. In this regard, each of the markings 18 can be utilized by the user to assist with proper alignment and/or to provide the depth at which the tip is located inside the fish. When so positioned, and due to the curvilinear nature of the spike, opening 17 will be aligned with the spinal cord 3 of the now-dead fish. At this time, the control knob 31 can be utilized to extend the second end of the wire 21b through the spinal column 3 which eliminates the motor neurons and causes the muscles of the fish to stop move after death. Finally, the knife 13 can be utilized to bleed the fish to preserve the meat.

Accordingly, the above-described integrated fish dispatching device functions to allow a user to quickly and humanely dispatch a caught fish so as to reduce suffering of the fish and to preserve the meat for human consumption.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A fish dispatching device, comprising:
   an elongated main body having a first end, a second end, and a hollow interior space;
   a spike that extends outward from the first end of the main body, said spike including a hollow interior space, and a sharpened tip portion that is configured to penetrate a head of a fish;
   an opening that is positioned along the spike, each of the opening, the hollow interior space of the spike and the hollow interior space of the main body forming a continuous interior channel; and
   an elongated wire that is positioned within the interior channel,
   wherein the spike includes a curved shape that is configured to position the opening adjacent to a spinal cord of the fish.

2. The device of claim 1, wherein the elongated wire is configured to transition between an extended position and a retracted position.

3. The device of claim 2, wherein in the extended position, a middle portion of the elongated wire is positioned through the opening, and a first end of the elongated wire is positioned outside of the interior channel.

4. The device of claim 3, wherein in the retracted position, each of the middle portion of the elongated wire and the first end of the elongated wire are positioned within the interior channel.

5. The device of claim 2, further comprising:
   a control knob that is connected to a second end of the elongated wire, said control knob functioning to transition the elongated wire between the extended position and the retracted position.

6. The device of claim 1, wherein the main body is constructed from a corrosion resistant material.

7. The device of claim 6, wherein the main body is constructed from metal.

8. The device of claim 1, wherein the spike is constructed from a corrosion resistant material.

9. The device of claim 8, wherein the spike is constructed from metal.

10. The device of claim 1, wherein the main body and the spike are constructed as a unitary component and are constructed from a corrosion resistant material.

11. The device of claim 1, further comprising:
    a knife that is connected to the main body.

12. A fish dispatching device, comprising:
    an elongated main body having a first end, a second end, and a hollow interior space;
    a spike that extends outward from the first end of the main body, said spike including a hollow interior space;
    an opening that is positioned along the spike, each of the opening, the hollow interior space of the spike and the hollow interior space of the main body forming a continuous interior channel;
    an elongated wire that is positioned within the interior channel;
    a knife that is connected to the main body.

13. The device of claim 12, wherein the elongated wire is configured to transition between an extended position and a retracted position.

14. The device of claim 13, wherein in the extended position, a middle portion of the elongated wire is positioned through the opening, and a first end of the elongated wire is positioned outside of the interior channel.

15. The device of claim 13, wherein in the retracted position, each of the middle portion of the elongated wire and the first end of the elongated wire are positioned within the interior channel.

16. The device of claim 13, further comprising:
    a control knob that is connected to a second end of the elongated wire, said control knob functioning to transition the elongated wire between the extended position and the retracted position.

17. The device of claim 12, wherein the main body is constructed from a corrosion resistant material.

18. The device of claim 12, wherein the main body is constructed from metal.

\* \* \* \* \*